Figure 1:
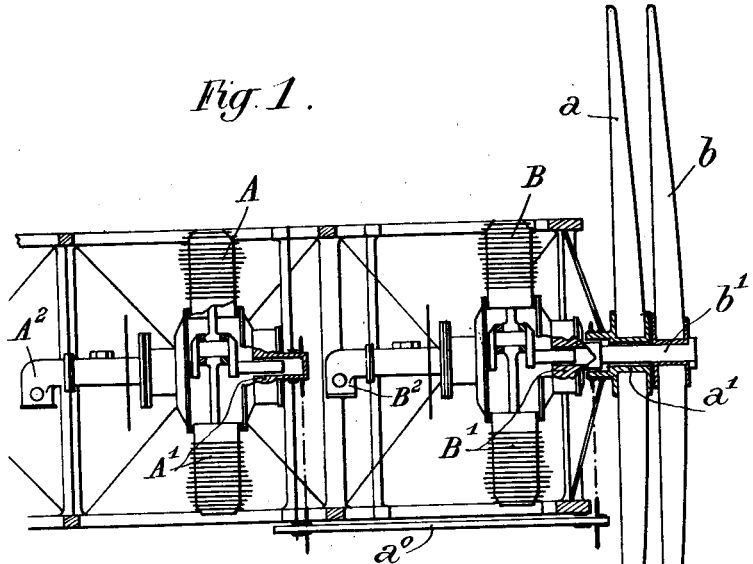

VLADIMIR LORENC & VICTOR LORENC.
DEVICE FOR PROPELLING AERIAL MACHINES.
APPLICATION FILED JUNE 19, 1912.

1,132,368.

Patented Mar. 16, 1915.
2 SHEETS—SHEET 1.

VLADIMIR LORENC & VICTOR LORENC.
DEVICE FOR PROPELLING AERIAL MACHINES.
APPLICATION FILED JUNE 19, 1912.

1,132,368.

Patented Mar. 16, 1915.
2 SHEETS—SHEET 2.

UNITED STATES PATENT OFFICE.

VLADIMIR LORENC AND VICTOR LORENC, OF PARIS, FRANCE.

DEVICE FOR PROPELLING AERIAL MACHINES.

1,132,368.  Specification of Letters Patent.  Patented Mar. 16, 1915.

Application filed June 19, 1912. Serial No. 704,609.

*To all whom it may concern:*

Be it known that we, VLADIMIR LORENC and VICTOR LORENC, engineers, subjects of the King of Hungary, Emperor of Austria, residing at 1 Place Gambetta, Paris, France, have invented certain new and useful Improvements in Devices for Propelling Aerial Machines, of which the following is a specification.

This invention relates to groups comprising each a motor, or a set of motors, and a propeller or a set of propellers, for aerial machines.

The invention has mainly for its object to allow the said groups to be constituted and disposed in a more favorable manner than hitherto.

The invention consists substantially in mounting the propellers of the various groups on the same axis and in such a manner that the propellers of each group are independent from the propellers of the other groups, and in so constructing and arranging the connections between the propellers and their corresponding motors that the said connections do not encircle either of the said propellers; in consequence of which it is possible, in using a certain number of such groups, to mount the propellers of all groups overhanging at the same end of the body or car of the aerial machine—i. e. in the manner which has been recognized as being the most favorable one, and has been used in the case of propellers driven by a single motor or by a set of motors which are interdependent, such propellers and motor or set of motors constituting in fact one of the hereinbefore mentioned groups—and it is also possible to readily transform a group, constituted of propellers and a motor or a set of motors already mounted on an aerial machine into a plurality of groups.

The invention refers more particularly to certain ways of carrying into practice the arrangement to which reference has just been made, and more especially to new industrial products comprising the groups consisting of a propeller or a set of propellers and a motor or a set of motors and involving the application of the principles above stated.

The invention will be easily understood with the assistance of the following description and with the aid of the annexed drawings, which are however merely given by way of example.

Figures 1, 2, 3 and 4 of the said drawings show diagrammatically longitudinal sections of four different ways of mounting two groups comprising each a propeller and a motor at the end of the body of an aeroplane, according to the invention.

According to the invention, and according to the way of carrying the same into effect to which the drawings more particularly refer, if we wish to mount at the end of the body of an aeroplane two groups comprising in each instance a propeller and a motor, the propellers of the two groups being mounted on the same axis and rotating in opposite directions, we proceed in the following or in some analogous manner.

Figure 2:
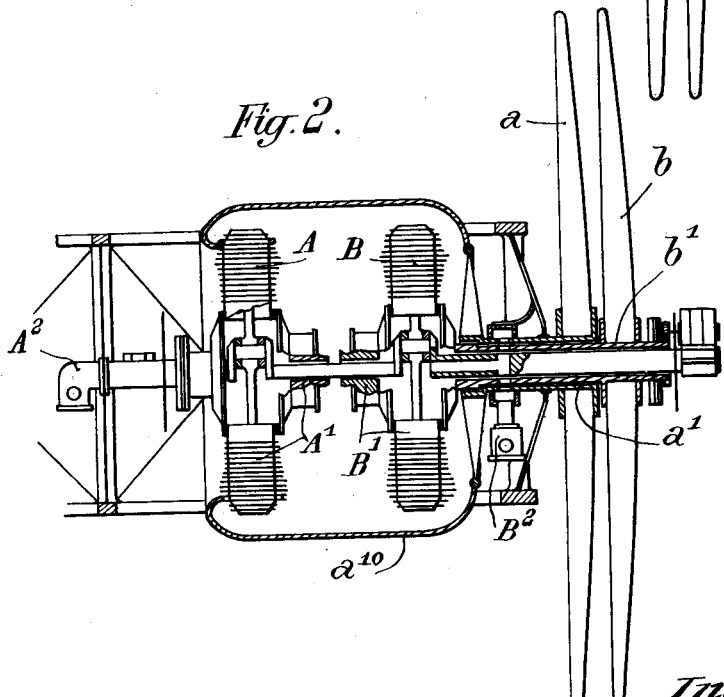
Figure 3:
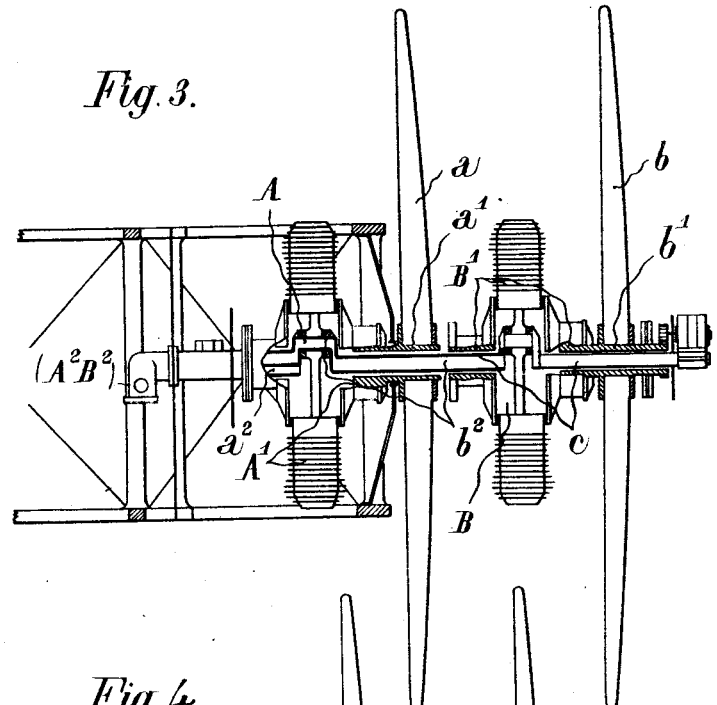
Figure 4:
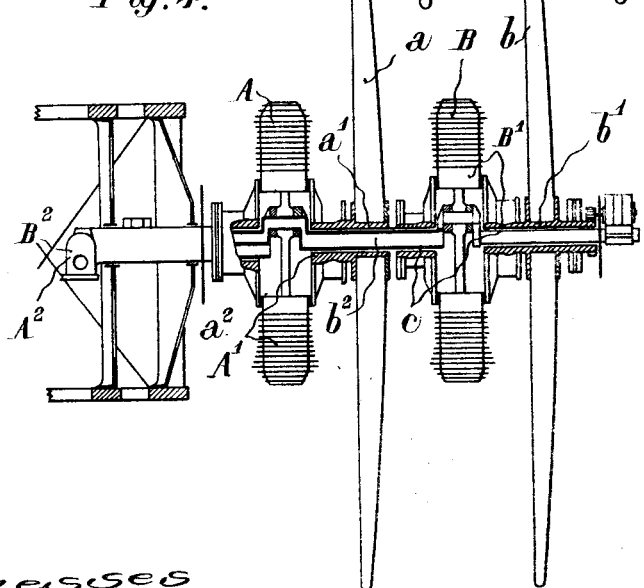

We first mount one of the propellers as $a$ on a sleeve $a^1$, which we mount loosely, for the ways of carrying out the invention shown in Figs. 1 and 2, on the shaft $b^1$ of the other propeller $b$, or, for the ways of carrying out the invention shown in Figs. 3 and 4, on the shaft $c$ which constitutes the crankshaft of the two motors, and in this last case, we mount the second one $b$ of the propellers on a sleeve $b^1$ which is also mounted loosely on the said shaft $c$; obviously the shafts $b^1$ or shaft $c$ have suitable dimensions to enable the propellers to be readily mounted. We use for rotating the said propellers $a$ and $b$ two independent motors having the axes of their rotary part coincident with the axis of the propellers and we use further, as means for connecting the rotary part of each one of the said motors to the shaft or sleeve carrying the corresponding propeller, means constructed and arranged to avoid encircling either propeller. And, we mount the said motors, or sets of motors, in such a manner that the axis of the rotary part of none of the said motors is the same as the axis of the said propellers, or in such a manner that the axis of the rotary part of one of the said motors coincides with the axis of the said propellers—in these two cases the motors are preferably superposed—or, in such a manner that the axis of the rotary parts of the two motors coincides with the axis of the said propellers. In this last case, we may mount the motors and connect them with the propellers in the various manners shown in Figs. 1 to 4. First, as shown in Fig. 1, we mount the propeller $a$ behind the propeller $b$, or more exactly between the said propeller $b$ and its corresponding motor B, and we dispose the motor A for the propeller $a$ behind the motor B, in such a manner that the axes of the rotary parts of the said motors—the crankshafts, if the said motors are not of the rotary type, or the casing, if the said motors are of the rotary type—coincide in order to reduce the resistance to flight and to allow the use of the usual frame for mounting the said motors. We connect the rotary part $B^1$ of the motor B directly to the shaft $b^1$, and we use, for connecting the rotary part $A^1$ of the motor A to the sleeve $a^1$, an auxiliary shaft $a^0$ mounted in suitable bearings fixed to the body of the aeroplane, and means such as chain-wheels and chains for connecting the said shaft $a^0$ with the said rotary part $A^1$ and with the said sleeve $a^1$; such a connection being a very favorable one, as it may be easily adjusted, by regulating the tension of the chains, without acting on the motor or on the propeller. Secondly, as shown in Fig. 2, we mount the motors and propellers and we connect the motor B to the propeller $b$ as hereinbefore described, but we use rotary engines to avoid the use of special parts extending from the members of the body to furnish support for the crank shaft and we connect the rotary part $A^1$ of the motor A to the sleeve $a^1$ by means of a drum $a^{10}$, which incloses the motor B and, of course, has its diameter selected to enable the motor B to freely rotate. And preferably we use for the two motors A and B the same crankshaft, which is a fixed one, as shown in Fig. 2. Thirdly, as shown in Figs. 3 and 4, we mount the propeller $a$ not only behind the propeller $b$, but also behind the motor B of the said propeller $b$; we use, as motor B, a rotary engine having its crank shaft $c$ projecting rearwardly into the body of the aeroplane and of such length that the said motor B supported altogether on this shaft, overhangs the body of the aeroplane; we use as motor A, a rotary engine, and, as crank-shaft for the said motor A, the rearwardly projecting part of the crank-shaft of the motor B, and we mount the said motor A either in the body of the aeroplane as shown in Fig. 3, or over-hanging with respect to the said body as shown in Fig. 4; and we directly connect the rotary parts $A^1$ and $B^1$ of the said motors respectively to the sleeves $a^1$ and $b^1$ of their corresponding propellers. And finally, if the motors used are internal combustion engines, we use, either, as shown in Figs. 1 and 2, two carbureters $A^2$ and $B^2$ which are independent of each other, or preferably, as shown in Figs. 3 and 4, in the case of two rotary engines having the same crankshaft, two grouped carbureters $A^2 B^2$, which are connected respectively with the inside of the casing, or with a suitable chamber in the casing, of the motors A and B, by means of suitable passages $a^2$, $b^2$, provided in the crankshaft and extending respectively from one of the carbureters to its corresponding motor.

Ordinarily, in regulating the motor the engineer will be guided by the noise of its operation, but the noise of the motor in the present case would not furnish a reliable criterion for the purpose of motor regulation, and it is preferable to employ in connection with the motor a speedometer, whereby regulation may be facilitated. Furthermore the lubrication and igniting of the said motors may be carried out in the same manner as described for the feeding of explosive mixture, if as shown in Figs. 2, 3 and 4, the two motors are rotary engines and have the same crank-shaft; for instance, if for igniting magnetos are to be used, the magneto for the motor B may be mounted on the crankshaft either at one of its ends or between the rotary parts of two adjoining motors.

As will be readily understood, the invention is not in any way restricted to the methods of carrying the same into effect which have been described in detail but includes all modifications.

Having now particularly described and ascertained the nature of our said invention and in what manner the same is to be performed, we declare that what we claim and desire to secure by Letters-Patent of the United States of America is:

1. Propulsion mechanism for aerial machines comprising a pair of co-axially mounted propellers, independent motors for driving the respective propellers and having crank shaft means, one of the motors directly driving the external propeller, the second propeller being loosely mounted on the crank shaft means appurtenant to the motor which directly drives the external propeller and being driven by the other motor, the latter being mounted between the external propeller and its driving motor on the one hand, and the body of the machine on the other hand.

2. Propulsion mechanism for aerial machines comprising a pair of co-axially mounted propellers, independent motors for driving the respective propellers and having crank shaft means, one of the motors directly driving the external propeller, the second propeller being loosely mounted on the crank shaft means appurtenant to the motor which directly drives the external propeller and being driven by the other motor, the latter being mounted between the external propeller and its driving motor on the one hand, and the body of the machine on the other hand, the operative connections between the second propeller and its corresponding motor including a rotatable element driven by said motor and having the same longitudinal direction as the axes of the propellers.

3. Propulsion mechanism for aerial machines comprising a pair of co-axially mounted propellers, independent rotary engines for driving the respective propellers and having a common fixed crank shaft which overhangs the body of the aeroplane, the propellers being mounted on the overhanging portion of said crank shaft in concentric relation thereto, and operative driving connections between the engines and the respective propellers, the said crank shaft having a passage throughout its length for conducting fuel gas to the engine which drives the external propeller.

4. Propulsion mechanism for aerial machines comprising a pair of co-axially mounted propellers, independent rotary engines for driving the respective propellers and having a common fixed crank shaft which overhangs the body of the aeroplane, the propellers being mounted on the overhanging portion of said crank shaft in concentric relation thereto, the engine for the external propeller being mounted between the propellers and the other engine being mounted between the internal propeller and the body of the aeroplane.

5. Propulsion mechanism for aerial machines comprising a pair of co-axially mounted propellers, independent rotary engines for driving the respective propellers and having a common fixed crank shaft which overhangs the body of the aeroplane, the propellers being mounted on the overhanging portion of said crank shaft in concentric relation thereto, the engine for the external propeller being mounted between the propellers and the other engine being mounted between the internal propeller and the body of the aeroplane, said engines having their rotating elements directly connected to the respective propellers to drive the latter.

In testimony whereof we have hereunto set our hands in presence of two subscribing witnesses.

VLADIMIR LORENC.
VICTOR LORENC.

Witnesses:
H. C. COXE,
PAUL BLUM.